US009514353B2

United States Patent
Zhang et al.

(10) Patent No.: US 9,514,353 B2
(45) Date of Patent: Dec. 6, 2016

(54) PERSON-BASED VIDEO SUMMARIZATION BY TRACKING AND CLUSTERING TEMPORAL FACE SEQUENCES

(75) Inventors: Tong Zhang, San Jose, CA (US); Di Wen, Beijing (CN); Xiaoqing Ding, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 108 days.

(21) Appl. No.: 14/347,280

(22) PCT Filed: Oct. 31, 2011

(86) PCT No.: PCT/CN2011/081545
§ 371 (c)(1),
(2), (4) Date: Mar. 26, 2014

(87) PCT Pub. No.: WO2013/063736
PCT Pub. Date: May 10, 2013

(65) Prior Publication Data
US 2014/0226861 A1    Aug. 14, 2014

(51) Int. Cl.
G06K 9/00    (2006.01)
G06K 9/62    (2006.01)

(52) U.S. Cl.
CPC ....... *G06K 9/00221* (2013.01); *G06K 9/00711* (2013.01); *G06K 9/6218* (2013.01); *G06K 9/00261* (2013.01); *G06K 9/00362* (2013.01); *G06K 9/6219* (2013.01)

(58) Field of Classification Search
None
See application file for complete search history.

(56) References Cited

U.S. PATENT DOCUMENTS

| 6,298,145 B1* | 10/2001 | Zhang | G06K 9/00228 348/169 |
|---|---|---|---|
| 7,555,149 B2 | 6/2009 | Peker et al. | |
| 2005/0152579 A1 | 7/2005 | Park et al. | |
| 2009/0080853 A1 | 3/2009 | Chen et al. | |
| 2009/0290791 A1 | 11/2009 | Holub et al. | |

(Continued)

FOREIGN PATENT DOCUMENTS

| CN | 101276468 A | 10/2008 |
|---|---|---|
| CN | 101477616 A | 7/2009 |
| JP | 2006228061 A | 8/2006 |

OTHER PUBLICATIONS

Tao, J, et al, "Efficient Clustering of Face Sequences with Application to Character-based Movie Browsing", Oct. 12-15, 2008.

(Continued)

*Primary Examiner* — Siamak Harandi
*Assistant Examiner* — Amandeep Saini
(74) *Attorney, Agent, or Firm* — Fabian VanCott

(57) ABSTRACT

A method for finding a temporal face sequence (412) includes, with a physical computing system (100), analyzing frames within a shot within a video, applying a face detection function to the frames, and in response to detecting a face within one of the frames, tracing a person associated with the face both backwards and forwards through frames within the shot. A temporal face sequence (412) is then defined as a sequence of frames that include frames within the shot spanning when the person is shown.

19 Claims, 6 Drawing Sheets

(56) References Cited

U.S. PATENT DOCUMENTS

2010/0008547 A1 1/2010 Yagnik et al.
2011/0292232 A1* 12/2011 Zhang ............... G06F 17/30247
  348/222.1

OTHER PUBLICATIONS

Wang, H. et al, "Facetrack Tracking and Summarizing Faces from Compressed Video", 1999.

* cited by examiner

PERSON-BASED VIDEO SUMMARIZATION BY TRACKING AND CLUSTERING TEMPORAL FACE SEQUENCES

BACKGROUND

Many applications exist that allow users to view, edit, analyze, and categorize digital video files. These applications may also include features that automatically identify faces that appear within the video and associate those faces with the person to which they belong. One way to organize a set of persons identified from a set of images or videos is to place similar faces into a face cluster. A face cluster is thus a collection of similar faces as determined by a face detection function.

Use of such face detection functions within a digital video may be difficult as a particular person may appear within a video with his or her face at an angle that is not amenable to the facial recognition function. Furthermore, a person will often appear midway through a shot or leave midway through a shot. A shot refers to a continuous video clip captured by a single video camera. A shot consists of a series of frames that when displayed in rapid succession, give the appearance of video. By analyzing the frames within video shots, face detection functions can be used to identify the faces that appear within the video.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

The present specification discloses methods and systems for video face clustering using temporal face sequencing. A temporal face sequence is a time range within a video wherein a particular person is visible. During this time range, the face may not be identifiable by a face detection function at all times. For example, the person may have his or her face positioned away from the camera. The methods and systems described herein allow a temporal face sequence to be determined despite the cases when a person is faced away from the camera. Additionally, these temporal face sequences can be used with face clustering functions that place temporal face sequences with similar faces into video face clusters.

According to certain illustrative examples, a shot within a video is analyzed frame-by-frame. A face detection function is applied to each analyzed frame until a face is found. If a face is found, the person associated with that frame is traced both forward and backward until that person is no longer within a frame. By tracing a person associated with a face both forward and backward in the sequence of frames forming the video, the time range in which a person is within a shot can be determined. This time range is referred to as the temporal face sequence for the person associated with the detected face.

The individual temporal face sequences can be analyzed to find one or more optimal frames within each sequence. The optimal frames are the ones with the best view of the subject's face for the face clustering function purposes. The face clustering function then compares the representative faces from each face temporal sequence and place matching faces into face clusters. Thus, a particular face cluster may include multiple temporal face sequences associated with the same person. These multiple temporal face sequences may be from multiple shots. These face clusters may be used for various video editing, tagging, or classification applications.

Through use of methods and systems embodying principles described herein, a video may be automatically analyzed and indexed so that the video clips within a video that include a particular person may be readily identified. Such a feature has many consumer, enterprise, entertainment, and security applications.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
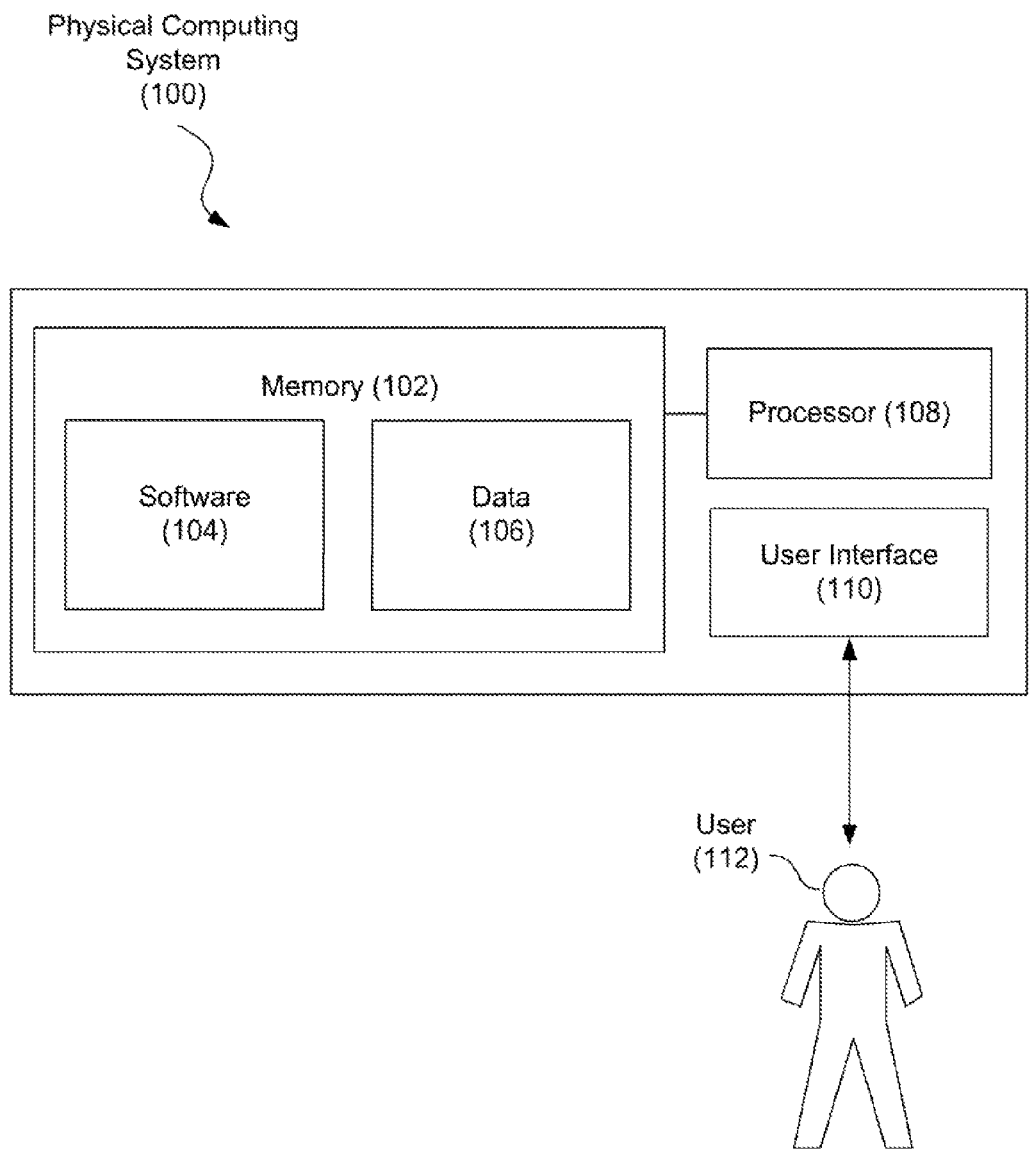
FIG. 1 is a diagram showing an illustrative physical computing system, according to one example of principles described herein.

Referring now to the figures, FIG. 1 is a diagram showing an illustrative physical computing system (100) that can be used to manage, index, and edit video files. According to certain illustrative examples, the physical computing system (100) includes a memory (102) having machine readable instructions (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of machine readable instructions (104) and data (106).

The physical computing system (100) also includes a processor (108) for executing the machine readable instructions (104) and using or updating the data (106) stored in memory (102). The machine readable instructions (104) may include an operating system. An operating system allows other applications to interact properly with the hardware of the physical computing system. Such other applications may include those as described above which allow users to analyze and index video files. An application capable of performing the functions described herein related to temporal face sequencing and face clustering is referred to as a video clustering application.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

Figure 2:
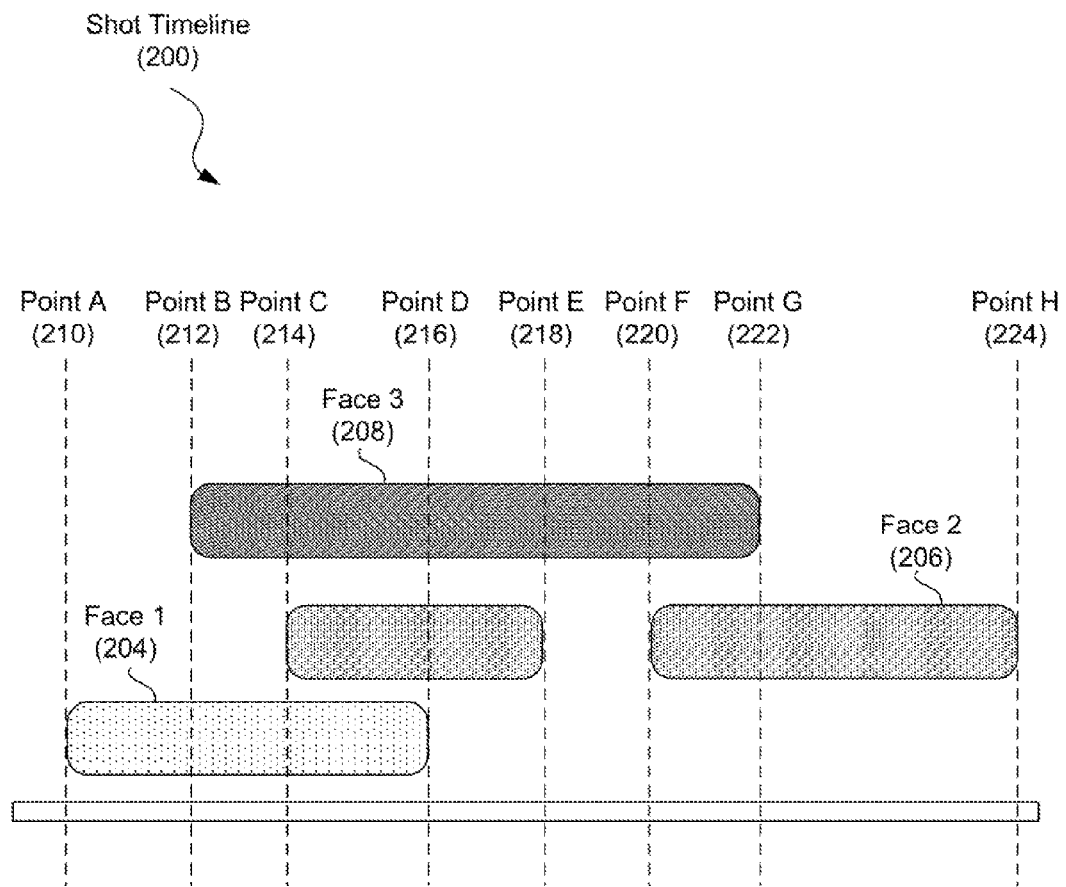
FIG. 2 is a diagram showing an illustrative shot timeline, according to one example of principles described herein.

FIG. 2 is a diagram showing an illustrative shot timeline. As mentioned above, a shot refers to a video clip where there is a continuous recording captured by the video camera. As the shot timeline (200) progresses, various persons may enter and exit the field of view within the frames. In some cases, only one person may be present within a shot. In some cases, multiple persons may be present at a particular time within a shot.

In the example shot timeline (200) shown in FIG. 2, a first person associated with Face 1 (204) first appears within the shot at Point A (210). At Point B (212), Face 3 (208) enters the shot. At Point C (214), Face 2 (206) also enters the shot. At this point, a total of three faces are within the shot. At Point D (216), Face 1 (204) leaves the shot. At Point E (218), Face 2 (206) also leaves the shot. At Point F (220), Face 2 (206) reenters the shot and remains within the shot until point H (224). At Point G (222), Face 3 (208) leaves the shot.

Being able to automatically analyze a video file and identify who appears and when can be useful for a variety of applications. For example, a consumer who takes home video may wish to automatically categorize video clips by who appears within them. When editing such video clips, it may be helpful to know exactly when a person enters the shot and when that person leaves the shot. In a further example, security operations that use surveillance video may wish to analyze large volumes of security footage and readily identify when a person enters and exits various shots taken with the security cameras.

Typically, video files are analyzed using a key-frame approach. Using such an approach, faces within a video are identified and associated with a key frame. The key frame is a frame that includes a good view of the face for face detection function purposes. One challenge of determining the full video sequence in which a person appears is that at certain times, a person's face may be positioned to face away from the camera. Alternatively, the lighting may be such that the person's face is not readily identifiable by the face detection function.

Figure 3A:
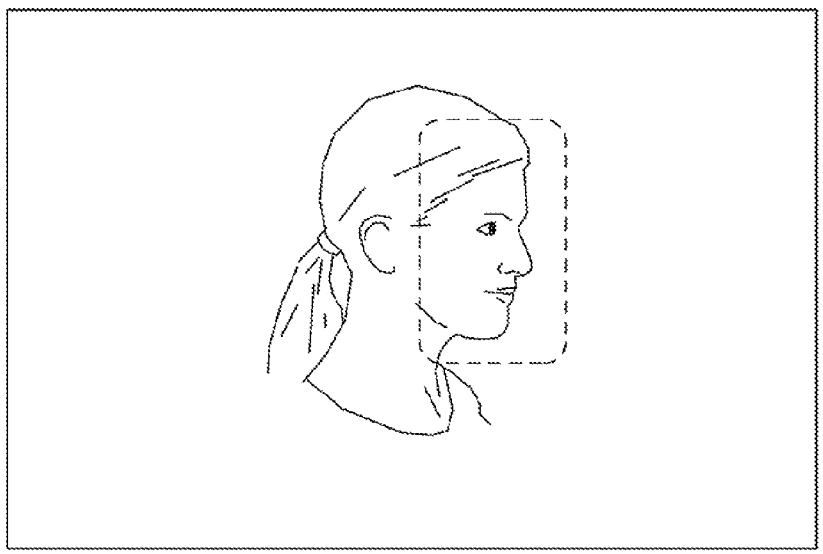
FIGS. 3A and 3B are diagrams showing illustrative frames that include a person's face, according to one example of principles described herein.
Figure 3B:
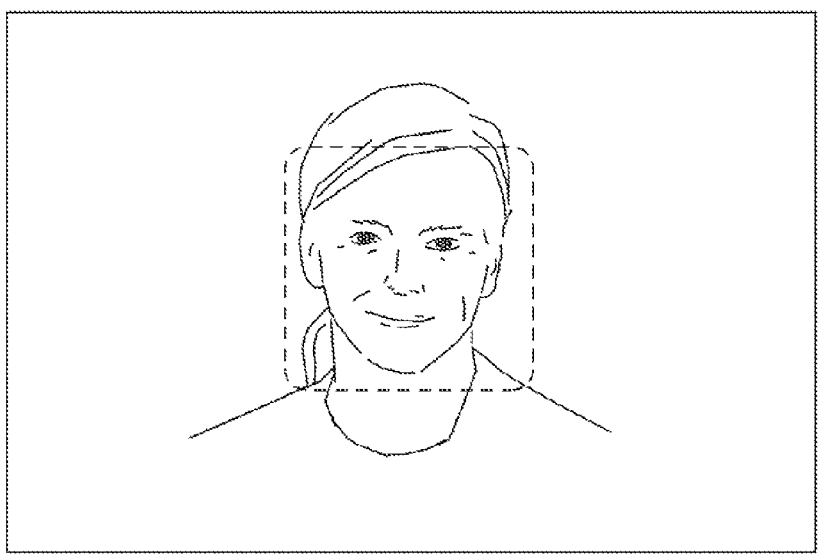

FIGS. 3A and 3B are diagrams showing illustrative frames that include a person's face. FIG. 3A is a diagram showing a frame with a person who is facing a direction that is generally perpendicular to the direction in which the camera is facing. In such a position, it may be difficult for a face detection function to detect the facial features of that face.

FIG. 3B is a diagram showing a frame with a person who is facing the camera. While the person is facing a direction that is generally towards the direction of the camera, a face detection function can better detect the features of that person's face. As video shots progress, a particular person may change the direction which they are facing. However, for purposes of determining the entire time range in which the person is present within a shot, a simple analysis of the frames in which the person's face is detectable by the face detection function is not sufficient. In light of this and other issues, the present specification discloses the use of temporal face sequences that may be used for video face clustering.

Figure 4:
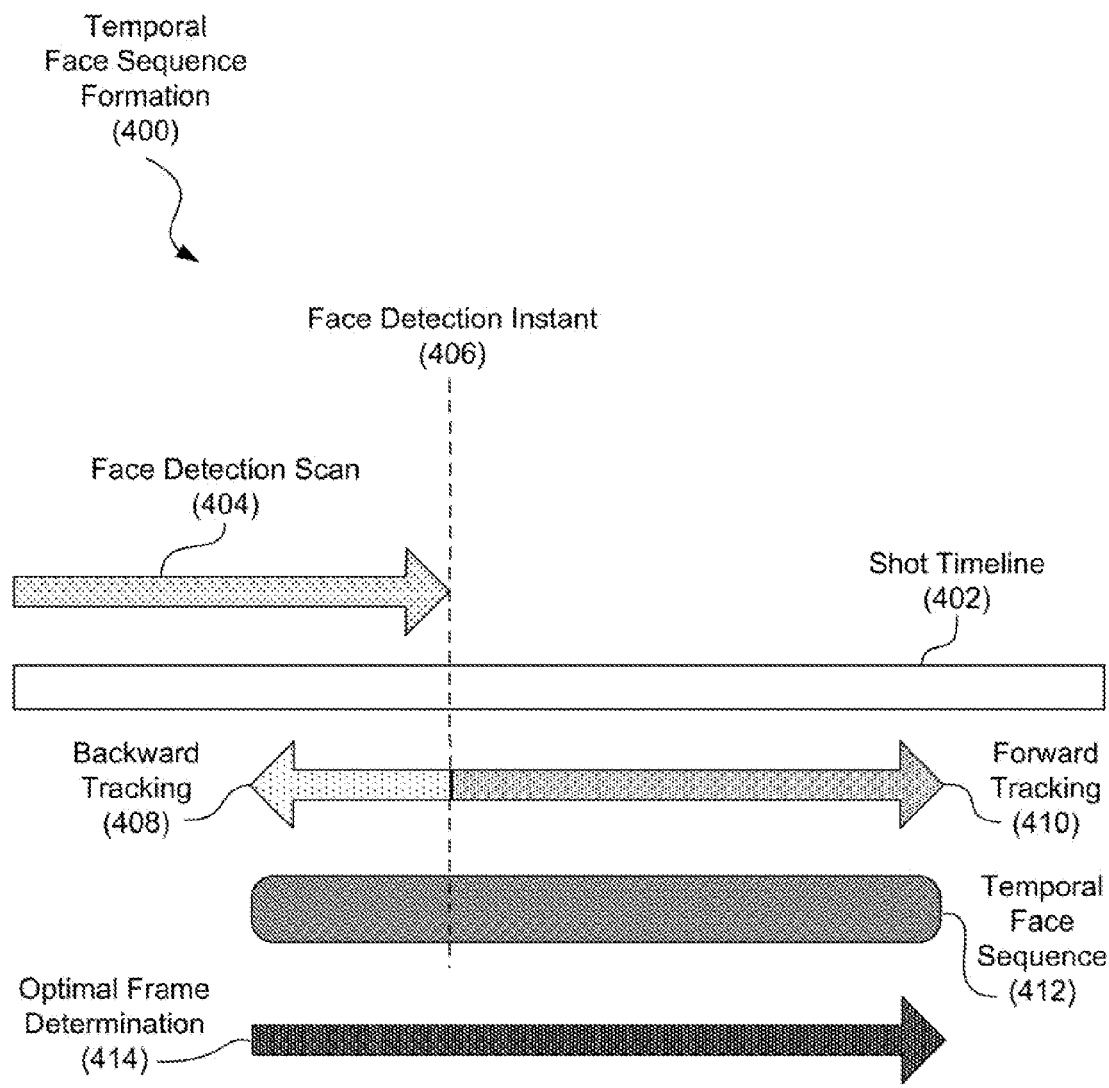
FIG. 4 is a diagram showing an illustrative temporal face sequence formation, according to one example of principles described herein.

FIG. 4 is a diagram showing an illustrative temporal face sequence formation (400). As mentioned above, a temporal face sequence is a sequence of frame in which a person appears within a shot whether or not his or her face is detectable by a face detection function. The temporal face sequences determined from a video may then be placed into video face clusters. A video face cluster is a group of temporal face sequences belonging to the same person.

According to certain illustrative examples, a face detection scan (404) is made progressively through the shot timeline (402). In some cases, the face detection scan may analyze each frame sequentially within the video in order to determine whether any faces can be detected. In some cases, the face detection scan (404) may analyze every nth frame, where n is a number defined by default or set by a user.

As the face detection scan (404) progresses, there may come a point where the face detection function can detect enough features of a face to be able to declare those features as a face. This face is referred to as the target object. This point is referred to as the face detection instant (408). Various face detection functions may have different criteria for determining how many facial features should be present in order to declare a set of analyzed features as a face.

From the face detection instant (408), the temporal face sequencing function performs a backward tracking operation to determine when the person associated with the detected face entered the shot. Additionally, the temporal face sequencing application performs a forward tracking operation to determine when the person associated with the detected face left the shot. The tracking function may use various features such as color and texture features to model the target object. The tracking function may involve various methods such as the particle filter methods. In addition, the tracking function may employ various additional features such as a head-and-shoulder model to help track the target object. The tracking function follows a person either backward or forward through the frame sequences even if the person's face is not identifiable by the face detection function.

For example, a head-and-shoulder detection model may be useful to screen out false alarms in face detection and face tracking. This may be done by verifying a candidate region of detected face or tracked face with a pre-trained head-and-shoulder model. If the candidate region does not match the head-and-shoulder model, then this candidate region is discarded, and other candidate regions may be pursued.

Various techniques may be used for the head-shoulder detection model. In one example, the head-and-shoulder detection may utilize a Histogram of Oriented Gradients (HOG) technique. A HOG technique counts occurrences of gradient orientation in localized portions of an image. This can be designed to look for head and shoulder models for tracking purposes. In a further example, Haar-like features may be used to identify head-and-shoulder features. Such a technique considers adjacent rectangular regions at a specific location in a detection window. The pixel intensities in those regions is then summed and the difference between those regions is calculated. These differences can be used to help detect head-and-shoulder features. In a further example, head-and-shoulder models using Haar-like features and HOG techniques can be cascaded in an arbitrary order to form a more complicated model.

In the case that a shot moves along a scene, a person may move inside or outside the frame as the shot moves. If a person moves outside the frame, the forward tracking function can be set to track a person until his or her face moves entirely out of the frame. In some cases, the tracking function may be set to track a person until a substantial portion of his or her face moves out of the frame. If a person moves into the frame during a shot, then the backward tracking function can track a person back to the point where a portion of that person first entered the shot. In some cases, the backward tracking function may only track a person back to the point where a substantial portion of that person is present within the frame. It may also be the case that a shot begins or ends while a person is still positioned within the middle of the frame. In such cases, a person is tracked forward or backward to either the beginning or end of the shot. Moreover, during backward tracking, it may be useful to determine if the backward tracking result is overlapping with an earlier face sequence output. In this case, the backward tracking function can be stopped.

As the tracking function moves frame by frame either forward or backward to track a person, the tracking function can be set to reapply the face detection function every n number of frames. The number n may be set to a default or be set manually by a user. For example, if n is 15, then the tracking function reapplies the face detection function every 15 frames. If the latest face as detected by the face detection function is near the tracking position, it may then be used for reference when analyzing subsequent frames. This reapplication of the face detection function can reduce the drifting effect during tracking. Reapplication of the face detection function can also be used to detect new faces within the shot.

After both the backward tracking (408) and forward tracking (410) processes have determined the temporal face sequence (412), the temporal face sequence may be analyzed to determine the optimal frames. In some cases, multiple optimal frames may be determined for a particular temporal face sequence (412). In some cases, a single optimal frame may be found. As mentioned above, the optimal frames are the frames that best represent the person's face for the purpose of comparing that face during the face clustering process.

Figure 5:
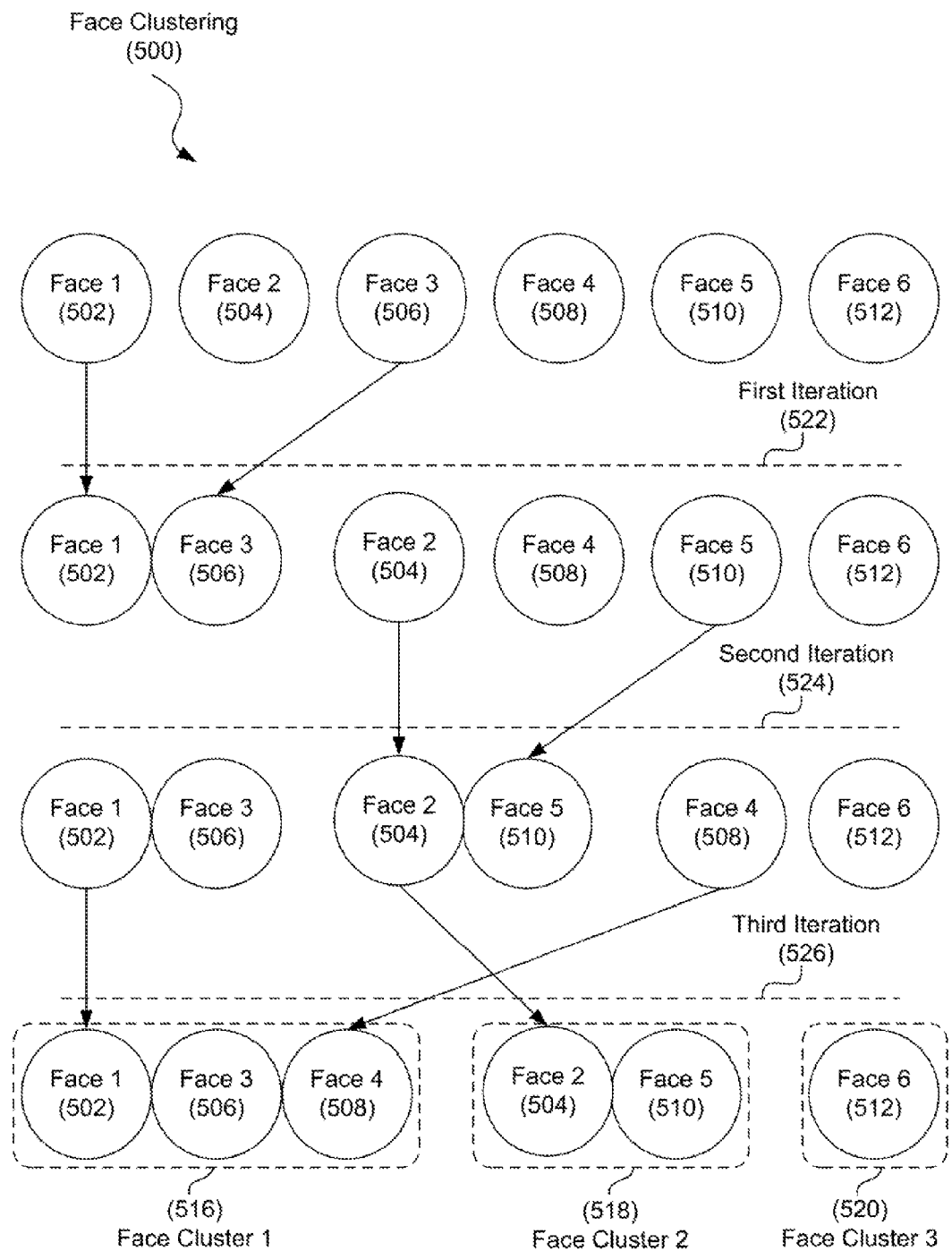
FIG. 5 is a diagram showing an illustrative face clustering, according to one example of principles described herein.

Various sets of criteria may be used to select the optimal frames within a temporal face sequence. The optimal frame determination function (414) can take into account a variety of factors such as angle of the face to the camera, eye localization, and size, as well as the illumination condition of the face and the face/eyes detection confidence values. For example, if a face is too small (i.e., takes up fewer than 200 pixels) then that face may not be a good candidate for an optimal frame. In some cases, a set of optimal frames found within a temporal face sequence may include high quality face images with different poses FIG. 5 is a diagram showing an illustrative face clustering (500). As mentioned above, a face cluster is a group of temporal face sequences that have been identified as being associated with the same person. A face clustering function associated with the video face clustering application may perform the process of placing the temporal face sequences into clusters. In one example, the face clustering function may be an agglomerative clustering function. The following example illustrates such an agglomerative clustering function. However, other face clustering functions may be used in association with the temporal face sequence principles described herein.

In this example, there are a total of seven faces, each face being associated with a temporal face sequence. The faces are numbered 1-7. The agglomerative function is an iterative function. For each of the iterations, the two strongest matches are grouped together.

In the first iteration (522), the face clustering function determines that the strongest similarity between any two faces within the set of faces is Face 1 (502) and Face 3 (506). Thus, these two faces are grouped together. During the second iteration (524), it is determined that Face 2 (504) and Face 5 (510) are the strongest match. Thus, those two faces are grouped.

When performing subsequent iterations, it may be the case that one or both of the clusters being compared contain more than one face. For example, the combination of Face 1 (502) and Face 3 (506) may be compared with Face 2 (504). In such cases, every pair of faces in the two clusters are matched and a similarity score is generated for each pair. In some cases, the largest scoring face pair can be used to represent the score between the two clusters. In some cases, the smallest scoring face pair can be used to represent the score between the two clusters. In some cases, the average score of all face pairs may be used to represent the score between the two clusters. In some cases, the similarity score may be weighted based on other factors such as the pose of a face. Particularly, two faces that have similar poses may be given greater weight Returning to the example of FIG. 5, during the third iteration (526), it is determined that the previously combined group of Face 1 (502) and face 3 (506) best matches with Face 4 (508). Thus, Face 4 (508) is added to that group of faces. In this case, the third iteration (526) is the final iteration, It may be determined that no further iterations are to be performed if none of the faces or groups of faces matches with any other face or group of faces (i.e. the similarity score between any pair of clusters is lower than a predetermined threshold).

In this example, the final result of the face clustering function is that Face 1 (502), Face 3 (506), and Face 4 (508) have been grouped together to form Face Cluster 1 (516). Additionally, Face 2 (504) and Face 5 (510) have been grouped together to form Face Cluster 2 (518). Face 6 (512) does not match any other faces and thus forms a face duster of its own, Face Cluster 3 (520).

The preceding example is a simplified case of seven faces. Practical face clustering functions may work with hundreds of temporal face sequences to form large video clusters. It may be the case that hundreds of iterations are performed in order to obtain a full and complete list. In some cases, a user may manually go through the face clusters and match any clusters together which should have been matched but were not.

In some examples, the face clustering function may operate under a number of constraints. For example, if two faces are from temporal face sequences that are overlapped in time, then it can be determined with certainty that those faces are not the same person. These two faces may be matched up as a "cannot-link" pair. The face clustering function may then operate under a cannot-link constraint. In the case that multiple optimal frames from a single temporal face sequence are used, those faces can be matched up with one another according to a "must-link" constraint, Such faces from the same temporal face sequence are automatically grouped together at the beginning of the clustering process by the face clustering function.

Figure 6:
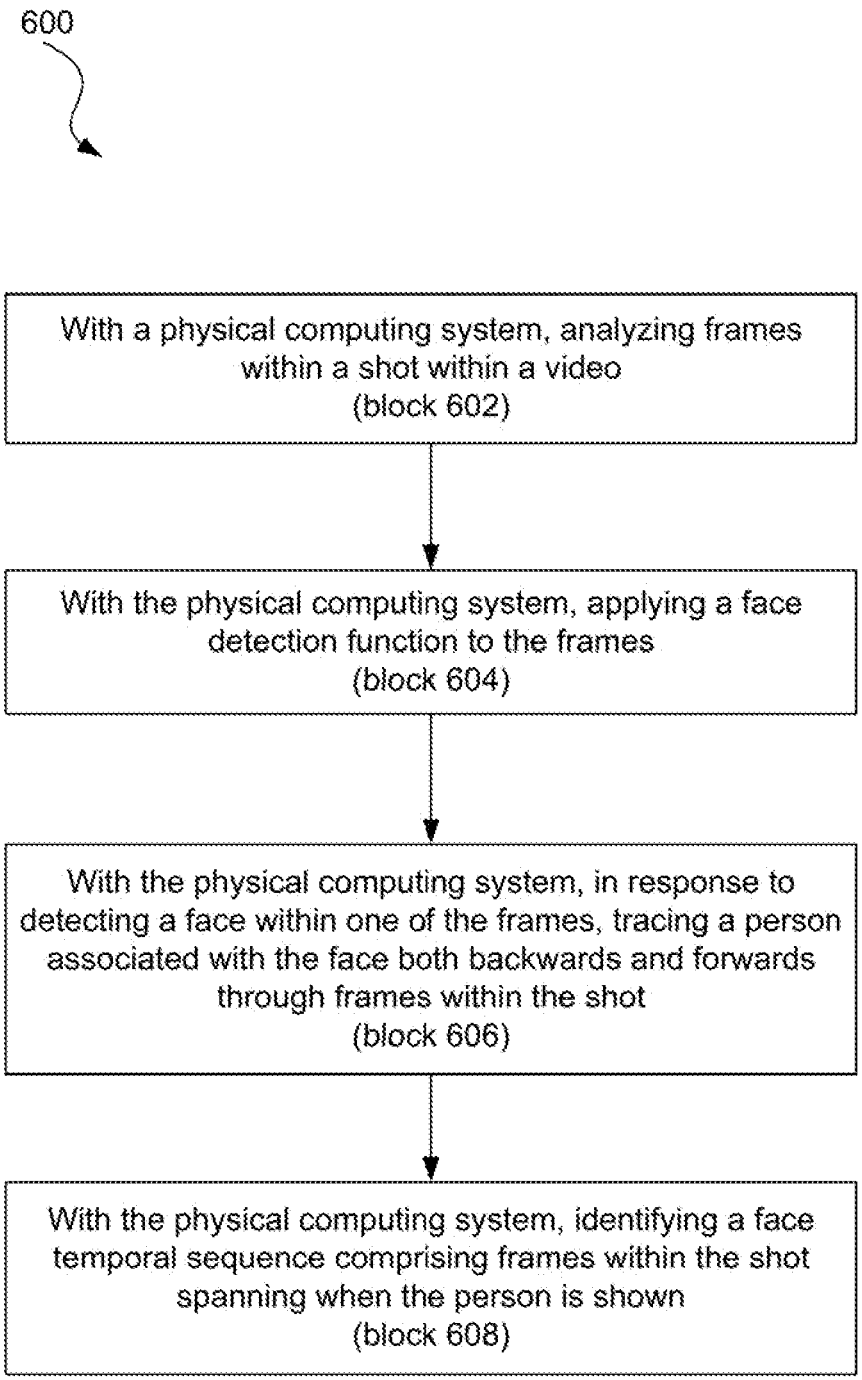
FIG. 6 is a flowchart showing an illustrative method for video face clustering using temporal face sequencing, according to one example of principles described herein.

FIG. 6 is a flowchart showing an illustrative method for video face clustering using temporal face sequencing. According to certain illustrative examples, the method includes, with a physical computing system, analyzing (block 602) frames within a shot within a video, with the physical computing system, applying (block 604) a face detection function to the frames, with the physical computing system, in response to detecting a face within one of the frames, tracing (block 606) a person associated with the face both backwards and forwards through frames within the shot, and with the physical computing system, identifying (block 608) a temporal face sequence comprising frames within the shot spanning when the person is shown.

In conclusion, by using temporal face sequences which identify the entire period when a person appears within a shot, a more useful tool for organizing and editing digital video is realized. Such temporal face sequences may also be clustered. Thus, a user of a video editing or analysis application may quickly find the clips within a video that a particular person appears.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for finding a temporal face sequence, the method comprising:
    applying, by a computing system, a face detection function to a shot within a video, wherein the shot comprises a series of frames;
    determining, by the computing system, a face detection instant, wherein the face detection instant is an instant the face detection function detects a face of a person within one frame of the frames;
    determining, by the computer system, a time the person enters the shot by backward tracking the person through the frames from the face detection instant;
    determining, by the computer system, a time the person leaves the shot by forward tracking the person through the frames from the face detection instant;
    determining, by the computing system, a time range from the time the person enters the shot to the time the person leaves the shot; and
    identifying a face temporal sequence for the person, wherein the face temporal sequence comprises the determined time range.

2. The method of claim 1, further comprising determining, by the computing system, an optimal frame within the temporal face sequence, wherein the optimal frame comprises an optimal image of the face to be used for face clustering, wherein determining the optimal frame includes determining at least one of an angle of the face to a camera, eye localization, size of the face, an illumination condition of the face, and detection confidence values.

3. The method of claim 2, further comprising applying, by the computing system, a face clustering function to a number of temporal face sequences from a number of shots from the video.

4. The method of claim 3, wherein the face clustering function comprises an agglomerative face clustering function.

5. The method of claim 3, wherein the face clustering function is subject to at least one of: a must-link constraint and a cannot-link constraint.

6. The method of claim 1, wherein forward tracking and backward tracking the person comprises using a head-and-shoulder model.

7. The method of claim 1, wherein the forward tracking and the backward tracking of the person comprises reapplying the face detection function every set number of frames.

8. The method of claim 1, wherein the face detection instant is a first instant the face detection function detects the face of the person and not another feature of the person.

9. A computing system comprising:
    at least one processor;
    a memory communicatively coupled to the at least one processor, the memory comprising computer executable instructions that, when executed by the at least one processor, causes the at least one processor to:
        apply a face detection function to a shot within a video, wherein the shot comprises a series of frames;
        determine a face detection instant, wherein the face detection instant is an instant the face detection function detects a face within one frame of the frames
        determine a time the person enters the shot by backward tracking the person through the frames from the face detection instant;
        determine a time the person leaves the shot by forward tracking the person through the frames from the face detection instant;
        determine a time range from the time the person enters the shot to the time the person leaves the shot; and
        identify a face temporal sequence for the person, wherein the face temporal sequence comprises the determined time range.

10. The system of claim 9, wherein the computer readable program code further comprises computer executable instructions that, when executed, cause the at least one processor to determine an optimal frame within the temporal face sequence, the optimal frame comprising an optimal image of the face to be used for face clustering, wherein to determine the optimal frame, the computer executable instructions, when executed, cause the at least one processor to determine at least one of an angle of the face to a camera, eye localization, size of the face, an illumination condition of the face, and detection confidence values.

11. The system of claim 10, wherein the computer readable program code further comprises computer executable instructions that, when executed, cause the at least one processor to apply a face clustering function to a number of temporal face sequences from a number of shots from the video and optimal frames within the number of temporal face sequences.

12. The system of claim 11, wherein the face clustering function comprises an agglomerative face clustering function.

13. The system of claim 11, wherein the face clustering function is subject to at least one of: a must-link constraint and a cannot-link constraint.

14. The system of claim 9, wherein to backward track and forward track the person, the computer executable instructions are to cause the at least one processor to use a head-and-shoulder model.

15. The system of claim 9, wherein to backward track and forward track the person, the computer executable instructions are to cause the at least one processor to reapply the face detection function every set number of frames.

16. The system of claim 9, wherein the face detection instant is a first instant the face detection function detects the face of the person and not another feature of the person.

17. A method for video face clustering executed by a computing system, the method comprising:
    applying, by the computing system, a face detection function to a series of frames of a shot within a video;
    determining a face detection instant, wherein the face detection instant is an instant the face detection function detects a face within one frame of the frames;

determining a time a person associated with the face enters the shot by backward tracking the person through the series of frames within the shot;

determining a time the person leaves the shot by forward tracking the person through the frames from the face detection instant;

determining a time range from the time the person enters the shot to the time the person leaves the shot;

defining a temporal face sequence identifying a subset of frames in which the person appears based on the determined time range;

determining a set of optimal frames within the temporal face sequence, the optimal frames comprising an optimal image of the face to be used for face clustering, wherein determining the set of optimal frames includes determining at least one of an angle of the face to a camera, eye localization, size of the face, an illumination condition of the face, and detection confidence values; and applying a face clustering function to a number of temporal face sequences from a number of shots from the video based on the determined set of optimal frames.

18. The method of claim 17, wherein the face clustering function is subject to at least one of: a must-link constraint and a cannot-link constraint.

19. The method of claim 17, wherein the face detection instant is a first instant a face of the person, and not another feature of the person, is first detected within one frame of the frames.

* * * * *